United States Patent [19]

Tietz

[11] Patent Number: 5,371,048
[45] Date of Patent: Dec. 6, 1994

[54] DENSE BARIUM CROWN OPTICAL GLASSES

[75] Inventor: Lisa A. Tietz, Painted Post, N.Y.

[73] Assignee: Corning Incorporated, Corning, N.Y.

[21] Appl. No.: 137,341

[22] Filed: Oct. 18, 1993

[51] Int. Cl.$^5$ .................. C03C 3/091; C03C 3/064
[52] U.S. Cl. ......................... 501/66; 501/69; 501/77
[58] Field of Search ................... 501/66, 69, 77

[56] References Cited

U.S. PATENT DOCUMENTS

| | | | |
|---|---|---|---|
| 1,943,051 | 1/1934 | Berger | 106/36.1 |
| 2,020,467 | 11/1935 | Heinz | 106/36.1 |
| 2,393,449 | 1/1946 | Armistead, Jr. | 106/54 |
| 3,173,779 | 3/1965 | Navias | 65/43 |
| 3,248,238 | 4/1966 | Faulstich | 106/54 |
| 3,498,805 | 3/1970 | Stalego | 106/50 |
| 3,949,335 | 4/1976 | Morgan | 335/154 |
| 3,970,466 | 7/1976 | Faulstich | 106/54 |
| 4,112,170 | 9/1978 | Bauscher | 428/212 |
| 4,179,300 | 12/1979 | Sagara | 106/47 |
| 4,311,504 | 1/1982 | Nigrin | 501/77 |
| 4,418,985 | 12/1983 | Kasori et al. | 501/66 |
| 4,593,006 | 6/1986 | Takabatake et al. | 501/77 |

OTHER PUBLICATIONS

Volf, Chemical Approach to Glass, pp. 471–474, 1984 no month.

*Primary Examiner*—Mark L. Bell
*Assistant Examiner*—Deborah Jones
*Attorney, Agent, or Firm*—Milton M. Peterson; Clinton S. Janes, Jr.

[57] ABSTRACT

A dense barium crown glass consisting essentially of, as calculated in weight % on an oxide basis, 35–42% $SiO_2$, 11–17% $B_2O_3$, 5.5–7.7% $Al_2O_3$, 35–42% BaO, 0.25–1.5% $Li_2O$. The glasses have a liquidus temperature bellow 900° C. and a viscosity at the liquidus temperature that is greater than 1000 Pa.s (10,000 poises).

6 Claims, 2 Drawing Sheets

DENSE BARIUM CROWN OPTICAL GLASSES

FIELD OF THE INVENTION

The field is barium borosilicate optical crown glasses.

BACKGROUND OF THE INVENTION

Barium crown glasses are well known in the optical glass art. They are designed to provide a relatively high refractive index ($n_D$) in conjunction with a high dispersion (Nu) value. In general, a barium crown glass will have a $n_D$ value greater than 1.55 and an Nu value greater than 55.

Barium crown glasses find particular application in molded optical glass elements. These include optical components used in optical measuring instruments and lens systems for light projectors.

It is well recognized that barium borosilicate glasses tend to have chemical durability problems. A considerable amount of composition study has gone into seeking a solution to this problem. One proposal has been to substitute other divalent oxides for BaO. This remedy has not found favor. It has also been proposed to add either $Al_2O_3$ or $La_2O_3$ to the glass composition. Current commercial practice employs a small amount of $Al_2O_3$ in the glass composition.

While the durability problem has been alleviated, other problems have persisted. In general, these problems arise in delivery and forming of molten glass. The glass has a tendency to devitrify during the delivery process. Also, a high liquidus temperature has necessitated delivering the glass at a relatively high temperature of about 950° C. A lower delivery temperature would facilitate forming by allowing faster mold cooling, higher press speeds, and closer dimensional control of the product.

Accordingly, a need has arisen for a dense barium crown glass having improved physical properties to facilitate delivery and forming of the glass. In particular, a lower liquidus temperature and a greater viscosity at the liquidus would be desirable. At the same time, it is necessary to maintain optical properties, as well as resistance to chemical and moisture attack. It is a basic purpose of the present invention to meet these needs.

SUMMARY OF THE INVENTION

The invention resides in a dense barium crown glass consisting essentially of, as calculated in weight percent on an oxide basis, 35–42% $SiO_2$, 11–17% $B_2O_3$, 5.5–7.7% $Al_2O_3$ 35–42% BaO, 0.25–1.5% $Li_2O$. The glasses of the invention will preferably also contain 0.25–1.0% $Sb_2O_3$ as a fining agent; not more than about 5% other oxides; and will have a liquidus temperature below 900° C. and a viscosity at the liquidus greater than 1000 pa.s (10,000 poises)..

DESCRIPTION OF THE INVENTION

Figure 1:
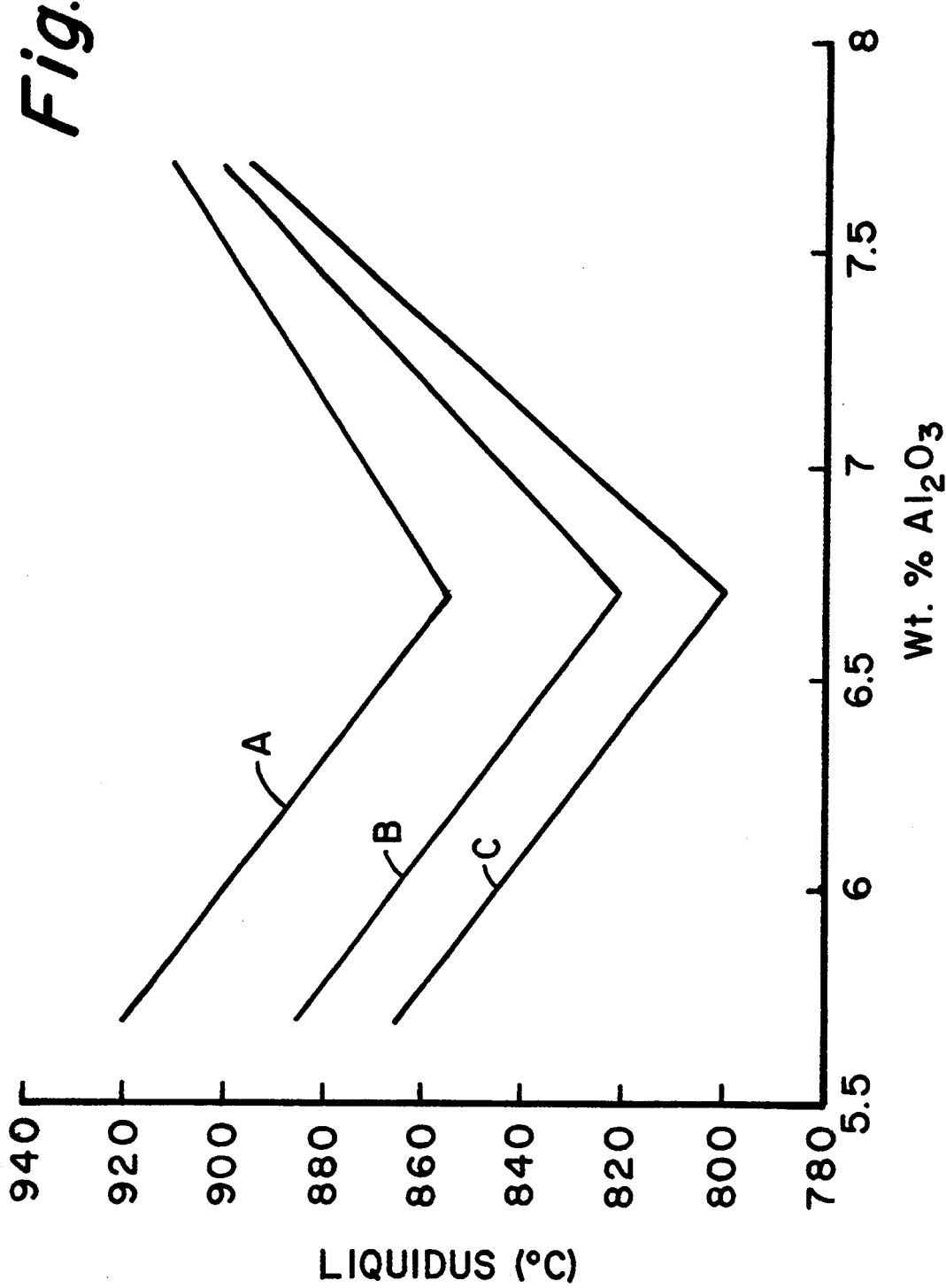
FIG. 1 is a graphical representation that illustrates the effect of $Al_2O_3$ and $B_2O_3$ on liquidus temperatures of glasses in accordance with the invention.

A dense barium crown glass is marketed by Corning Incorporated, Corning, N.Y. under Code 8382. Two other glasses, having similar properties and compositions and referred to herein as glasses A and B, are also commercially available. TABLE I shows the analyzed compositions of these three commercial glasses. The compositions are set forth in approximate weight percent on an oxide basis.

TABLE I

|  | Code 8382 | A | B |
| --- | --- | --- | --- |
| $SiO_2$ | 38.3 | 38.7 | 40.7 |
| $Al_2O_3$ | 4.7 | 5.0 | 5.0 |
| $B_2O_3$ | 15.7 | 14.9 | 13.8 |
| BaO | 40.6 | 40.1 | 39.2 |
| $As_2O_3$ | — | 1.0 | — |
| $Sb_2O_3$ | 0.4 | 0.3 | 0.25 |
| $Li_2O$ | 0.25 | — | 0.98 |
| Optical | | | |
| $n_d$ | 1.58913 | 1.58913 | 1.59030 |
| $Nu_d$ | 61.27 | 61.27 | 61.25 |
| Physical | | | |
| Softening | 758 | — | 722 |
| Anneal | 628 | 658 | 597 |
| Strain | 593 | — | 565 |
| Expansion | 64.5 | 65 | 66.1 |
| Density | 3.292 | 3.3 | 3.271 |
| Liquidus | | | |
| Internal (°C.) | 955 | — | 915 |
| Viscosity (Pa · s) | 600 | — | 800 |

The present invention arose in the course of studies designed to improve properties of Code 8382 glass that related to delivery and forming of the molten glass. A particular aim was to reduce the glass liquidus temperature. It was hoped that this would alleviate the tendency of the glass to devitrify during the delivery process. Also, a lower liquidus temperature would permit a lower delivery temperature. As explained earlier, a lower delivery temperature would provide a variety of benefits in the forming process.

Initial studies were directed at determining the effect of substituting other divalent oxides, such as CaO, SrO and ZnO, for BaO in the base Code 8382 composition. These studies indicated little or no effect on the liquidus temperature, or, in the case of ZnO, an actual increase in the temperature.

Studies on other composition substitutions revealed that a small increase of about 2% in the $Al_2O_3$ content lowered the liquidus temperature by as much as 80° C. However, this trend was reversed with larger additions of $Al_2O_3$. Consequently, an optimum $Al_2O_3$ effect was found at about 6.7% $Al_2O_3$ content.

Increasing the $B_2O_3$ content was also found to be beneficial in lowering the liquidus temperature. However, such increases also had a deleterious effect on acid durability. Consequently, this expedient may not be useful in some applications. For example, good acid durability is of considerable importance in an optical glass. This property correlates with both higher $SiO_2$ contents and lower $B_2O_3$ contents in the present glasses.

Once a lower liquidus temperature became possibility, it then became desirable to decrease the working temperature of the glass. It was found that this could be accomplished by increasing the $Li_2O$ content to about 1%. However, $Li_2O$ also has a strong effect on refractive index. To maintain the original refractive index of the glass then, it becomes necessary to reduce the BaO content.

It is evident that the optimum glass composition for any given purpose represents a compromise among the contents of the several glass components, and the consequent properties imparted by the components. Our studies indicate that the selection should be made from the following components within the indicated ranges in weight percent:

SiO$_2$ 35–42%
B$_2$O$_3$ 11–17%
Al$_2$O$_3$ 5.5–7.7%
BaO 35–42%
Li$_2$O 0.25–1.5%

The invention is further described with respective to specific embodiments. TABLE II sets forth several compositions of glasses that are representative of the invention. The compositions are set forth in approximate weight percent on an oxide basis as calculated from the glass batch. Relevant properties for the glasses are also set forth.

TABLE II

|  | 1 | 2 | 3 | 4 | 5 | 6 |
|---|---|---|---|---|---|---|
| SiO$_2$ | 38.1 | 38.3 | 38.1 | 37.3 | 38.7 | 40.4 |
| Al$_2$O$_3$ | 4.7 | 4.7 | 6.7 | 6.7 | 6.7 | 5.0 |
| B$_2$O$_3$ | 15.6 | 15.6 | 13.6 | 13.6 | 13.6 | 13.6 |
| BaO | 40.3 | 35.6 | 40.3 | 40.3 | 38.9 | 38.9 |
| SrO | 0.7 | 5.0 | 0.7 | 0.7 | 0.7 | 0.7 |
| Sb$_2$O$_3$ | 0.4 | 0.4 | 0.4 | 0.4 | 0.4 | 0.4 |
| Li$_2$O | 0.25 | 0.25 | 0.25 | 1.0 | 1.0 | 1.0 |
| Liquidus |  |  |  |  |  |  |
| Internal | 930 | 940 | 850 | 850 | 835 | 920 |
| Optical |  |  |  |  |  |  |
| n$_D$ | 1.5895 | — | 1.5918 | 1.5941 | 1.5898 | 1.5898 |
| Nu | 61.2 | — | 60.3 | 60.4 | 60.7 | 61.0 |

Glass batches were formulated based on the compositions set forth in TABLE II. Standard glass-making materials, such as oxides, carbonates and nitrates, were employed in batching. Except for Example 2, SrO was not intentionally added to a batch. Rather, it was introduced as an impurity in the source of BaO.

Each batch was turbula-mixed, and a 1400 gram portion melted in a 650cc platinum crucible. Melts were made in both electric and gas-fired furnaces. In order to obtain homogeneous glasses, a double-melt procedure was employed. In this procedure, the batch was placed in a furnace for three hours at 1500° C. and the melt drigaged, that is quenched by pouring into water. The glass was then remelted for three hours at a temperature of 1350° C., stirred at 1200° C. for one hour, and then held for one hour at 1200° C. to allow for fining. Slabs about 15×15×2.5 cm (6"×6"×1") were poured into preheated steel molds on a preheated table.

Glass samples for liquidus, physical properties, refractive index, and acid durability tests were cut from homogeneous, cord-free areas of the slabs.

The physical properties measured were softening (Soft.), annealing (Ann.) and strain points (Str.), expressed in terms of ° C. These were determined by standard fiber elongation procedures. Thermal expansion coefficients (Exp.) were measured over the temperature range 0—300° C. and expressed in terms of $10^{-7}$/° C.

The liquidus temperatures (Liquidus Int.) of the glasses were measured using the standard, 24-hr. gradient technique. A platinum boat filled with <20 mesh crushed glass was heated in a gradient furnace for 24 hours. The highest temperature at which crystals were observed was considered the liquidus point of the glass. The accuracy of this measurement is typically +/−15° C.

Refractive indices (n$_D$) and dispersion (Nu$_e$) were measured using a Bausch and Lomb low-range refractometer. No special annealing was used for these measurements.

Acid durability measurements were made according to the American Optical (AO) standard test. Polished glass plates were soaked in 10% HCl for 30 second and 10 minute time intervals, at room temperature. Appearance and weight loss were reported.

TABLE III shows composition and property data for a set of glasses in which the Al$_2$O$_3$ and B$_2$O$_3$ contents are varied at the expense of SiO$_2$.

Density measurements (Den.), expressed in terms of g/cm$^3$, were carried out using a modified form of a Westphal balance.

TABLE III

|  | 7 | 8 | 9 | 10 | 11 | 12 | 13 | 14 | 15 |
|---|---|---|---|---|---|---|---|---|---|
| SiO$_2$ | 41.7 | 40.7 | 39.7 | 39.7 | 38.7 | 37.7 | 37.7 | 36.7 | 35.7 |
| Al$_2$O$_3$ | 5.7 | 6.7 | 7.7 | 5.7 | 6.7 | 7.7 | 5.7 | 6.7 | 7.7 |
| B$_2$O$_3$ | 11.6 | 11.6 | 11.6 | 13.6 | 13.6 | 13.6 | 15.6 | 15.6 | 15.6 |
| BaO | 38.9 | 38.9 | 38.9 | 38.9 | 38.9 | 38.9 | 38.9 | 38.9 | 38.9 |
| SrO | 0.7 | 0.7 | 0.7 | 0.7 | 0.7 | 0.7 | 0.7 | 0.7 | 0.7 |
| Sb$_2$O$_3$ | 0.4 | 0.4 | 0.4 | 0.4 | 0.4 | 0.4 | 0.4 | 0.4 | 0.4 |
| Li$_2$O | 1.0 | 1.0 | 1.0 | 1.0 | 1.0 | 1.0 | 1.0 | 1.0 | 1.0 |
| Liquidus |  |  |  |  |  |  |  |  |  |
| Int. | 920 | 855 | 910 | 885 | 820 | 900 | 865 | 800 | 895 |
| Optical |  |  |  |  |  |  |  |  |  |
| n$_D$ | 1.5877 | 1.5876 | 1.5876 | 1.5896 | 1.5895 | 1.5903 | 1.5911 | 1.5903 | 1.5893 |
| Nu$_e$ | 60.9 | 60.4 | 60.0 | 60.5 | 60.2 | 60.1 | 60.4 | 60.3 | 60.2 |
| Physical |  |  |  |  |  |  |  |  |  |
| Soft. | 733 | 731 | 731 | 725 | 727 | 723 | 723 | 719 | 724 |
| Ann. | 604 | 598 | 598 | 598 | 599 | 594 | 599 | 597 | 598 |
| Str. | 572 | 566 | 563 | 566 | 566 | 563 | 568 | 569 | 567 |
| Exp. | 68.0 | 67.9 | 67.4 | 67.4 | 67.4 | 67.3 | 67.9 | 67.3 | 67.1 |
| Den. | 3.277 | 3.273 | 3.262 | 3.281 | 3.283 | 3.283 | 3.286 | 3.277 | 3.272 |

Acid durability measurements were made on glasses having compositions 11 and 14 in TABLE III. The glasses showed visible darkening after 30 seconds and had an iridized appearance after ten minute exposure to 10% HCl. Weight loss was measured in mg/cm$^2$ on the ten minute exposure samples. The loss was 0.064 mg/cm$^2$ for glass 11 and 0.16 for glass 14. This indicates the effect on durability when B$_2$O$_3$ is substituted for SiO$_2$.

It will be observed that all of the glasses have n$_D$ values greater than 1.587 and dispersion values of at least 60. However, the internal liquidus values vary markedly.

The liquidus values are graphically plotted in FIG. 1 of the accompanying drawing. In that FIG., Al$_2$O$_3$ content is plotted on the horizontal axis in weight percent, and liquidus is plotted in ° C. on the vertical axis. Curve A represents data for a content of 11.6% $B_2O_3$; Curve B for 13.6% $B_2O_3$; Curve C for 15.6% $B_2O_3$.

It is evident that a minimum liquidus temperature is obtained with a content of about 6.7% $Al_2O_3$ in the glass. Also, the increase in $B_2O_3$ content decreases the liquidus temperature. However, it also results in poorer chemical durability.

Figure 2:
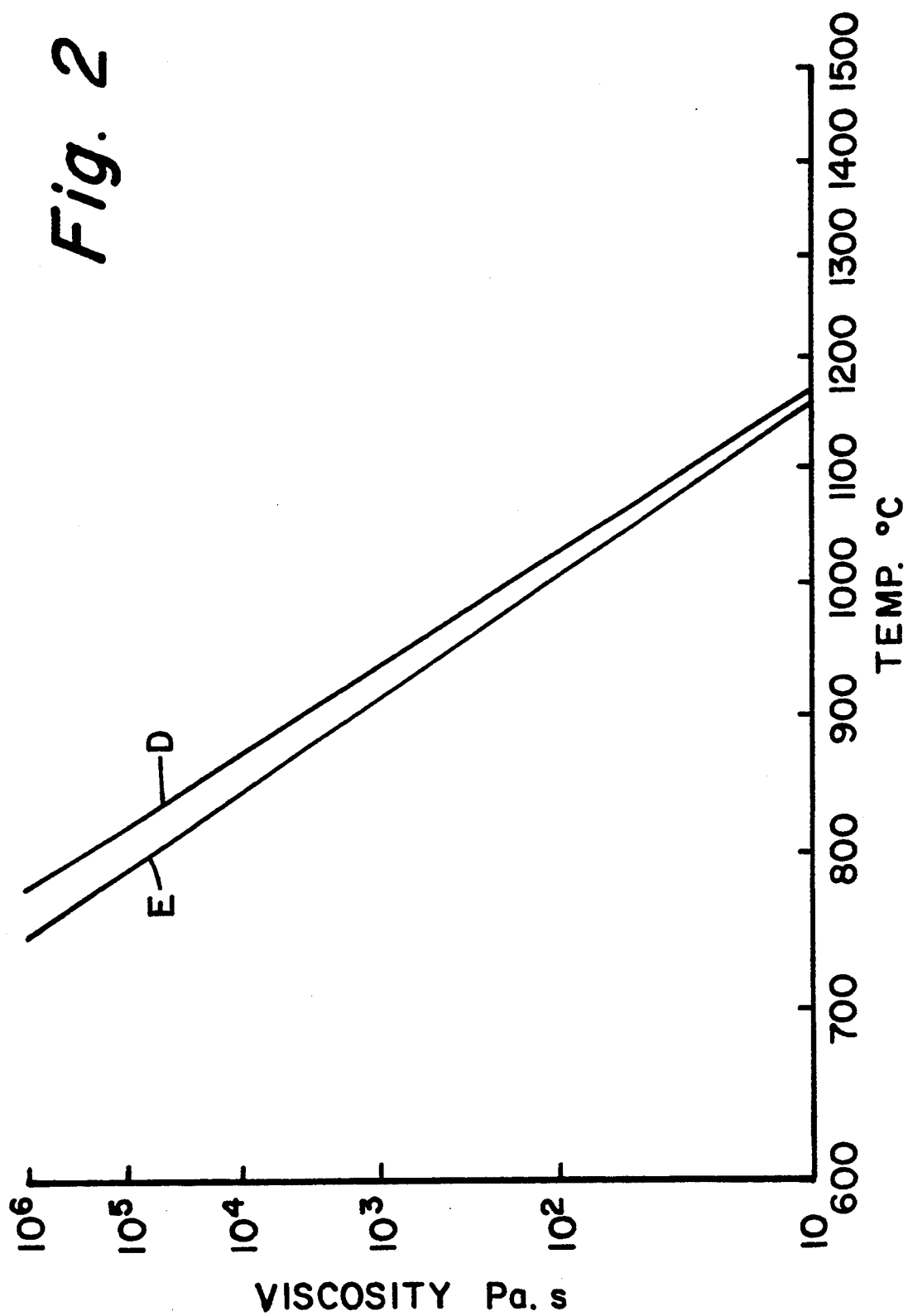
FIG. 2 is a graphical representation illustrating the effect of liquidus temperature on viscosity of the glass at that temperature.

FIG. 2 is a graphical representation that illustrates the effect of the reduced liquidus values on the viscosity of a glass at the liquidus temperature. In FIG. 2, temperature, in ° C., is plotted along the horizontal axis and viscosity, expressed in Pa.s, equivalent to poises divided by ten, is plotted along the vertical axis. Curve D is the viscosity-temperature curve for Code 8382 glass, while Curve E is the viscosity-temperature curve for my preferred glass which is a glass having composition 5 in TABLE II. It will be observed that the 100° C. decrease in liquidus temperature represents an increase of greater than one magnitude in viscosity at that temperature, a great boon to glass delivery.

I claim:

1. A dense barium crown glass consisting essentially of, as calculated in weight % on an oxide basis., 35–42% $SiO_2$, 11–17% $B_2O_3$, 5.5–7.7% $Al_2O_3$, 35–42% BaO, 0.25–1.5% $Li_2O$.

2. A dense barium crown glass in accordance with claim 1 further containing 0.25–1.0% $Sb_2O_3$ as a fining agent.

3. A dense barium crown glass in accordance with claim 1 wherein the named oxides constitute at least 95% of the glass composition.

4. A dense barium crown glass in accordance with claim 1 which has a liquidus temperature below 900° C. and a viscosity at the liquidus temperature that is greater than 1000 Pa.s (10,000 poises).

5. A dense barium crown glass in accordance with claim 1 consisting essentially of, as calculated in weight % on an oxide basis, 38–40% $SiO_2$, 12–14% $B_2O_3$, 6–7.5% $Al_2O_3$, 38–40% BaO, and 0.5–1.5% $Li_2O$.

6. A dense barium crown glass consisting of, as calculated in weight % on an oxide basis, 38.7% $SiO_2$, 13.% $B_2O_3$, 6.7% $Al_2O_3$, 38.9% BaO, 1.0% $Li_2O$, 0.4% $Sb_2O_3$, and 0.7% SrO.

* * * * *

UNITED STATES PATENT AND TRADEMARK OFFICE
CERTIFICATE OF CORRECTION

PATENT NO. : 5,371,048

DATED : December 6, 1994

INVENTOR(S) : Lisa A. Tietz

It is certified that error appears in the above-identified patent and that said Letters Patent is hereby corrected as shown below:

Column 2, lines 57-58, "possibility" should be --possible--.

Column 3, line 9, "respective" should be --respect--.

Column 6, line 20, "13.%" should be --13.6%--.

Abstract, line 5, "bellow" should be --below--.

Signed and Sealed this

Fourth Day of April, 1995

*Attest:*

BRUCE LEHMAN

*Attesting Officer*   Commissioner of Patents and Trademarks